(12) United States Patent
Mahanta (10) Patent No.: US 11,128,547 B2
(45) Date of Patent: Sep. 21, 2021

(54) VALUE OPTIMIZATION WITH INTELLIGENT SERVICE ENABLEMENTS

(71) Applicant: SAP SE, Walldorf (DE)

(72) Inventor: Prabal Mahanta, Bangalore (IN)

(73) Assignee: SAP SE, Walldorf (DE)

( * ) Notice: Subject to any disclaimer, the term of this patent is extended or adjusted under 35 U.S.C. 154(b) by 44 days.

(21) Appl. No.: 16/205,087

(22) Filed: Nov. 29, 2018

(65) Prior Publication Data

US 2020/0177477 A1 Jun. 4, 2020

(51) Int. Cl.
*H04L 12/24* (2006.01)
*H04L 29/08* (2006.01)

(52) U.S. Cl.
CPC ...... *H04L 41/5029* (2013.01); *H04L 41/0826* (2013.01); *H04L 41/5012* (2013.01); *H04L 41/5032* (2013.01); *H04L 41/5064* (2013.01); *H04L 67/16* (2013.01)

(58) Field of Classification Search
CPC . H04L 41/00; H04L 41/0823; H04L 41/0826; H04L 41/085; H04L 41/0853; H04L 41/0866; H04L 41/0896; H04L 41/50; H04L 41/5012; H04L 41/5019; H04L 41/5029; H04L 41/5032; H04L 41/5061; H04L 41/5064; H04L 43/0004; H04L 43/06; H04L 43/08; H04L 67/00; H04L 67/16; G06F 11/00; G06F 11/30; G06F 11/34; G06F 11/3468
See application file for complete search history.

(56) References Cited

U.S. PATENT DOCUMENTS

| | | | |
|---|---|---|---|
| 7,072,858 B1 * | 7/2006 | Litzow | G06Q 30/02 705/14.69 |
| 8,290,818 B1 * | 10/2012 | Levitan | G06Q 30/0631 705/26.7 |
| 10,171,312 B2 * | 1/2019 | Kannan | H04L 41/5009 |
| 10,438,229 B1 * | 10/2019 | Viswanath | G06Q 30/0261 |
| 10,467,557 B1 * | 11/2019 | Kodesh | H04L 41/0813 |
| 10,749,762 B2 * | 8/2020 | Bellini, III | H04L 41/5074 |
| 2003/0233329 A1 * | 12/2003 | Laraki | H04L 29/12009 705/52 |
| 2006/0053132 A1 * | 3/2006 | Litzow | G06Q 30/02 |
| 2008/0154694 A1 * | 6/2008 | Litzow | G06Q 30/02 705/26.64 |
| 2008/0319884 A1 * | 12/2008 | Yi | G06Q 30/04 705/34 |

(Continued)

*Primary Examiner* — Boris D Grijalva Lobos
(74) *Attorney, Agent, or Firm* — Mintz Levin Cohn Ferris Glovsky and Popeo, P.C.

(57) ABSTRACT

Systems, methods, and techniques to efficiently optimize values associated with subscription services. The method includes retrieving usage information relating to one or more cloud services subscribed to by a user and provided by a plurality of cloud service providers. The method further includes determining, by the at least one processor and in response to the retrieving, authorization information and value information associated with the user and the one or more cloud services. The method further includes optimizing, by the at least one processor and in response to the determining, a number of cloud services and/or a value associated with the number of cloud services based on the usage information, authorization information, and value information.

12 Claims, 9 Drawing Sheets

(56) References Cited

U.S. PATENT DOCUMENTS

| | | | |
|---|---|---|---|
| 2010/0131650 A1* | 5/2010 | Pok | H04L 41/0896 709/226 |
| 2011/0116374 A1* | 5/2011 | Bearden | H04L 1/0001 370/234 |
| 2011/0138050 A1* | 6/2011 | Dawson | H04L 67/327 709/226 |
| 2011/0295986 A1* | 12/2011 | Ferris | H04L 67/32 709/222 |
| 2011/0313882 A1* | 12/2011 | Barthes | G06Q 30/00 705/26.25 |
| 2012/0130850 A1* | 5/2012 | Suzuki | G06Q 30/0633 705/26.8 |
| 2012/0239515 A1* | 9/2012 | Batra | G06Q 30/0631 705/26.1 |
| 2013/0060933 A1* | 3/2013 | Tung | H04L 41/50 709/224 |
| 2014/0040625 A1* | 2/2014 | Belenky | G06F 21/64 713/180 |
| 2014/0058872 A1* | 2/2014 | Sandholm | G06Q 30/0601 705/26.1 |
| 2014/0171022 A1* | 6/2014 | Kiene | H04M 15/765 455/408 |
| 2014/0278807 A1* | 9/2014 | Bohacek | G06Q 30/0206 705/7.35 |
| 2014/0310065 A1* | 10/2014 | Chowdhary | G06Q 30/0283 705/7.35 |
| 2015/0074279 A1* | 3/2015 | Maes | G06F 9/5072 709/226 |
| 2015/0326461 A1* | 11/2015 | Singh | H04L 43/12 709/221 |
| 2016/0149768 A1* | 5/2016 | Hooshiari | H04L 41/5064 709/224 |
| 2016/0205518 A1* | 7/2016 | Patel | H04L 65/1073 455/518 |

* cited by examiner

VALUE OPTIMIZATION WITH INTELLIGENT SERVICE ENABLEMENTS

TECHNICAL FIELD

The subject matter described herein relates to cloud service subscriptions and techniques to optimize values associated with subscribed services.

BACKGROUND

Cloud services may be provided by one or more cloud service providers. Each of the cloud service providers may have separate cloud service interfaces which may have different formats, or other requirements for cloud service providers and/or cloud services. Users may subscribe to different cloud services which may be provided by more than one cloud service provider.

Prior systems for analyzing and navigating decision logic involved static rule reports or logs of all executed rules; embedding some explanation of the decisions within the decision results, typically in the form of "reason codes" or other such codes; and IDE-based debuggers that can control the decision management system and step through its execution in an interactive fashion.

SUMMARY

This document presents systems, methods, and techniques to optimize values associated with subscribed services from one or more cloud service providers. In one aspect, there is provided a system. The system may include at least one data processor and at least one memory. The at least one memory may store instructions that result in operations when executed by the at least one data processor. The operations may include retrieving, by at least one processor, usage information relating to one or more cloud services subscribed to by a user and provided by one or more cloud service providers. The operations may further include determining, by the at least one processor and in response to the retrieving, authorization information and value information associated with the user and the one or more cloud services. In addition, the operations may include optimizing, by the at least one processor and in response to the determining, a number of cloud services and/or a value associated with the number of cloud services based on the usage information, authorization information, and value information.

In some variations, one or more features disclosed herein including the following features may optionally be included in any feasible combination. The value information may include a price associated with a subscription for a single cloud service of the one or more cloud services. The value information may include a price associated with a subscription for a bundle of cloud service of the one or more cloud services. The authorization information may include subscription information related to the one or more cloud services subscribed to by the user. The optimizing can include unsubscribing the user from at least one cloud service of the one or more cloud services subscribed to by the user thereby reducing the number of cloud services and reducing the value associated with the number of cloud services In another aspect, there is provided a method for using a machine learning model to generate recommendations for forming a process flow. The method may include retrieving, by at least one processor, usage information relating to one or more cloud services subscribed to by a user and provided by one or more cloud service providers. The method may further include determining, by the at least one processor and in response to the retrieving, authorization information and value information associated with the user and the one or more cloud services. In addition, the method may include optimizing, by the at least one processor and in response to the determining, a number of cloud services and/or a value associated with the number of cloud services based on the usage information, authorization information, and value information.

In another aspect, there is provided a computer program product that includes a non-transitory computer readable storage medium. The non-transitory computer-readable storage medium may include program code that causes operations when executed by at least one data processor. The operations may include retrieving, by at least one processor, usage information relating to one or more cloud services subscribed to by a user and provided by one or more cloud service providers. The operations may further include determining, by the at least one processor and in response to the retrieving, authorization information and value information associated with the user and the one or more cloud services. In addition, the operations may include optimizing, by the at least one processor and in response to the determining, a number of cloud services and/or a value associated with the number of cloud services based on the usage information, authorization information, and value information.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the prediction of anomalies in the operations of a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to an enhanced organization of decision logic that includes rules, and which enables information to be efficiently evaluated. The enhanced organization may eliminate redundant evaluations and may make it possible to freely navigate in forward or backward directions on the information to view details about decision entities (decision tables, decision trees, rulesets, scorecards, etc.) executed by the decision management system for a particular decision and to understand the decision logic flow.

Rules, rulesets, and ruleset metaphors are forms of processing logic commonly used in a Business Rule Management System (BRMS). A rule expresses logic in the form of a set of conditions evaluated on some input, paired with a set of actions executed if the rule conditions evaluate to true. Rules are typically grouped in a structure called a ruleset. A function takes parameters, executes a series of statements and returns a value. Decision metaphors can take various forms, including decision tables, decision trees, decision graphs, and scorecards. Each of these forms provides a different way to express a set of rules in a way that best matches the natural representation for a given use case. At runtime, there are multiple, common techniques for executing decision logic using either a special rule engine or a code generation technique.

Figure 1:
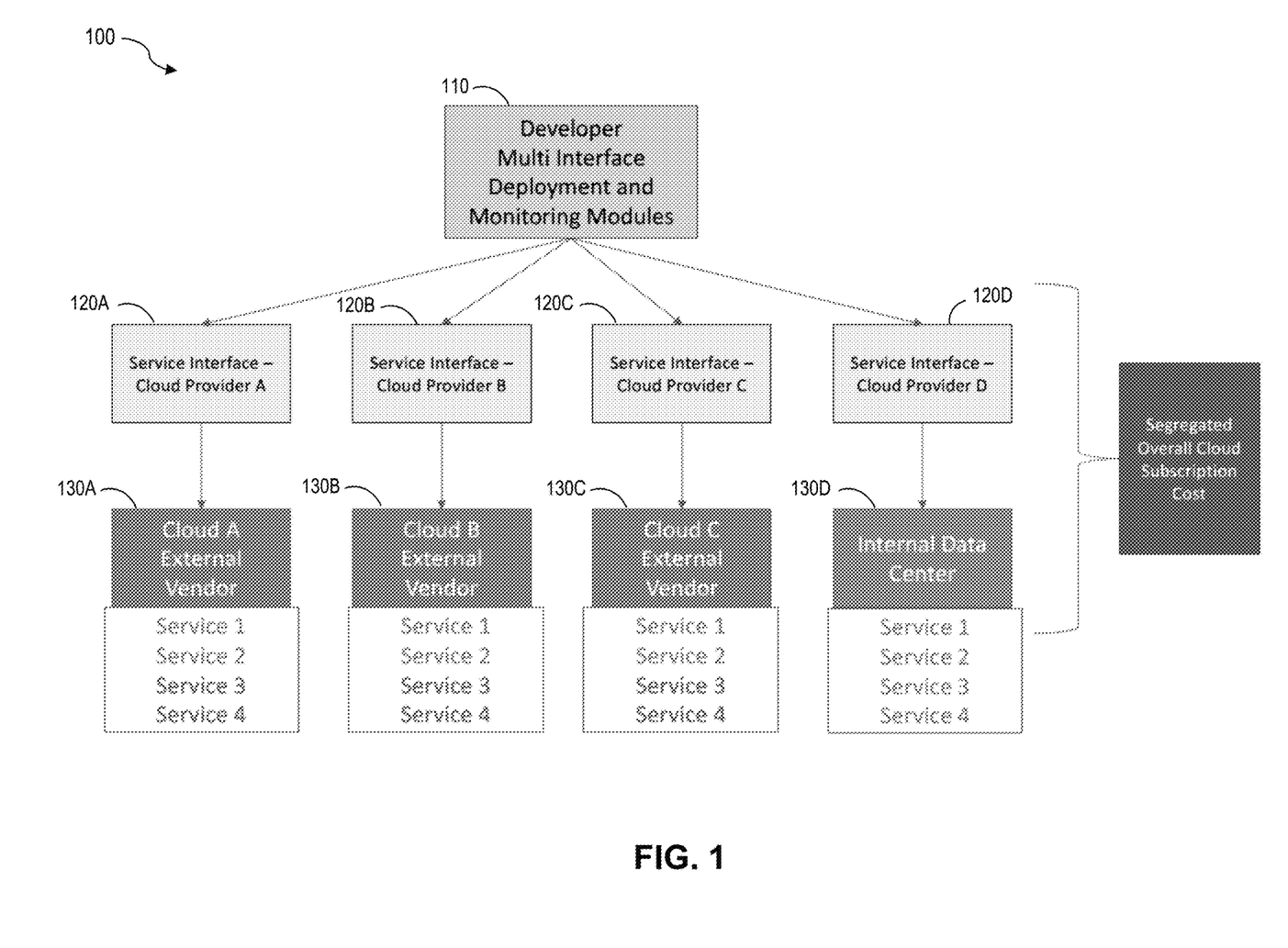
FIG. 1 depicts a diagram of a cloud services system, in accordance with some example embodiments.

FIG. 1 depicts a diagram illustrating a cloud services system 100, in accordance with some example implementations. Referring to FIG. 1, the cloud services system 100 may include a developer interface 110 in communication with different cloud service interfaces 120A-120D. As shown in FIG. 1, each of the cloud service interfaces 120A-120C are associated with corresponding cloud vendors 130A-C and cloud service interface 120D is associated with an internal cloud data center 130D. The cloud vendors 130A-C may provide one or more services. In FIG. 1, cloud vendors 130A-C provide Service 1 and Service 2 and do not provide Service 3 and Service 4. The internal cloud data center 130D provides Services 1-4. Different services offered by the cloud vendors 130 may have different costs or values associated with them. For example, Service 1 may have a different value than any of the Services 2-4. Often the services offered by the cloud vendors 130 are bundled and sold to users as part of subscription. Accordingly, users may purchase services that they do not need as part of the cloud vendor 130 bundle of services.

Embodiments described herein relate to determining and segregating the services offered by cloud vendors 130 and providing an abstraction layer that allows a user to optimize the services that are provided and optimize the value exchanged for the services used by the user.

Figure 2:
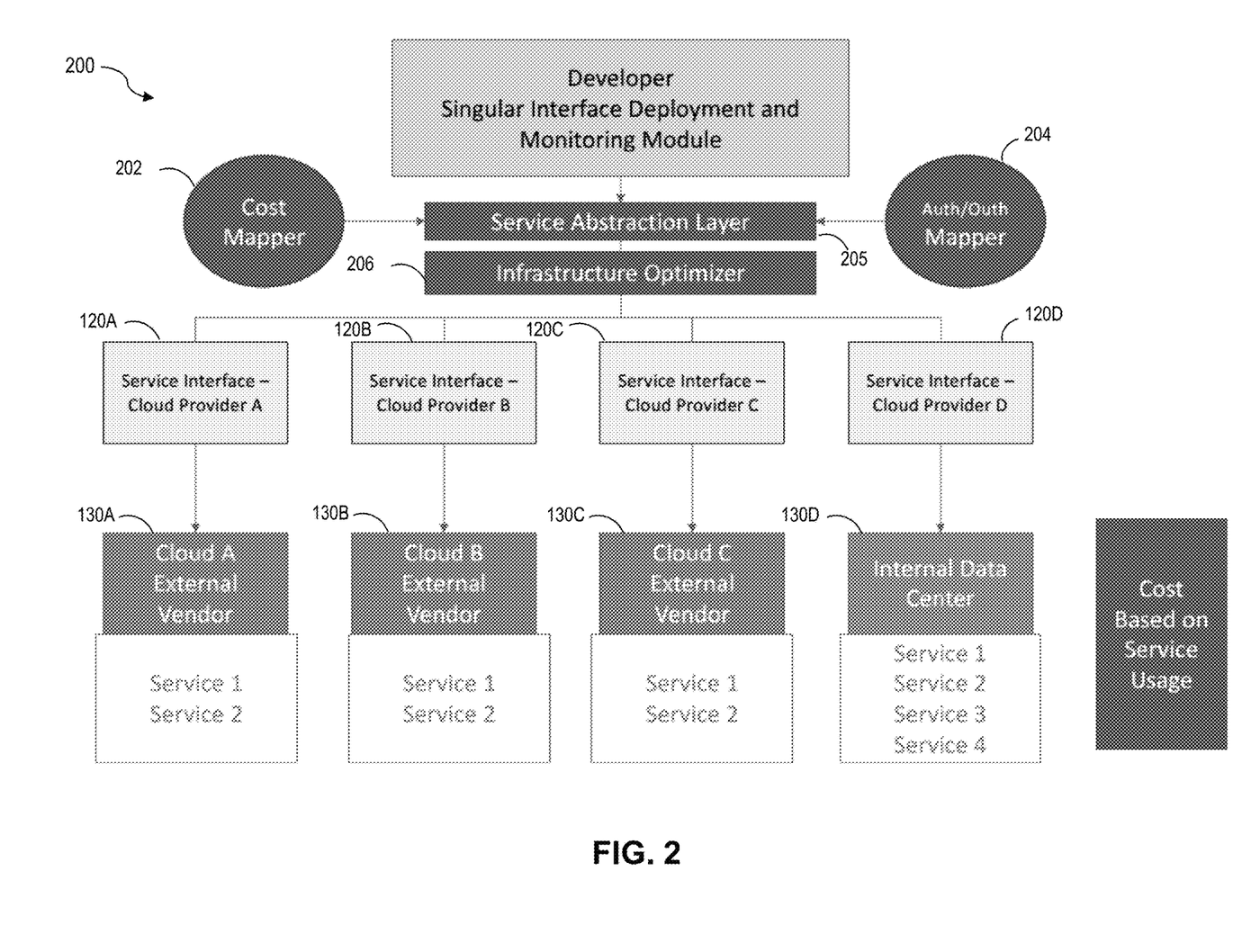
FIG. 2 depicts a diagram of a cloud services system including a service abstraction layer and an infrastructure optimizer, in accordance with some example embodiments.

FIG. 2 depicts a diagram illustrating a cloud services system 200, in accordance with some example implementations. As shown in FIG. 2, the cloud services system 200 includes a cost mapper 202, an authorization mapper 204, a service abstraction layer 205, and an infrastructure optimizer 206. The cost mapper 202 may map values associated with the services provided by the cloud vendors 130. The values may include a price of a single service or a price of the bundle of services. The authorization mapper 204 may map authorizations of a user to particular services and/or cloud vendors 130. For example, the authorization mapper 204 may determine which cloud services and/or cloud vendors 130 the user is subscribed to. The service abstraction layer 205 may provide a single interface for the user to view, access, and/or use the services it has subscribed to and/or view services offered by different cloud vendors 130. The infrastructure optimizer 206 may receive inputs from the cost mapper 202 and the authorization mapper 204 and determine an optimized infrastructure for the user. For example, the infrastructure optimizer 206 may determine that the user is subscribed to cloud vendor 130A, which provides Services 1-4, but the user only uses Services 1 and 2. Accordingly, the infrastructure optimizer 206 may remove subscriptions to Services 3 and 4 from the user's account. This reduction in services may reduce the value exchanged for the subscription with cloud vendor 130A and the overall cost of subscriptions paid by the user.

Figure 3:
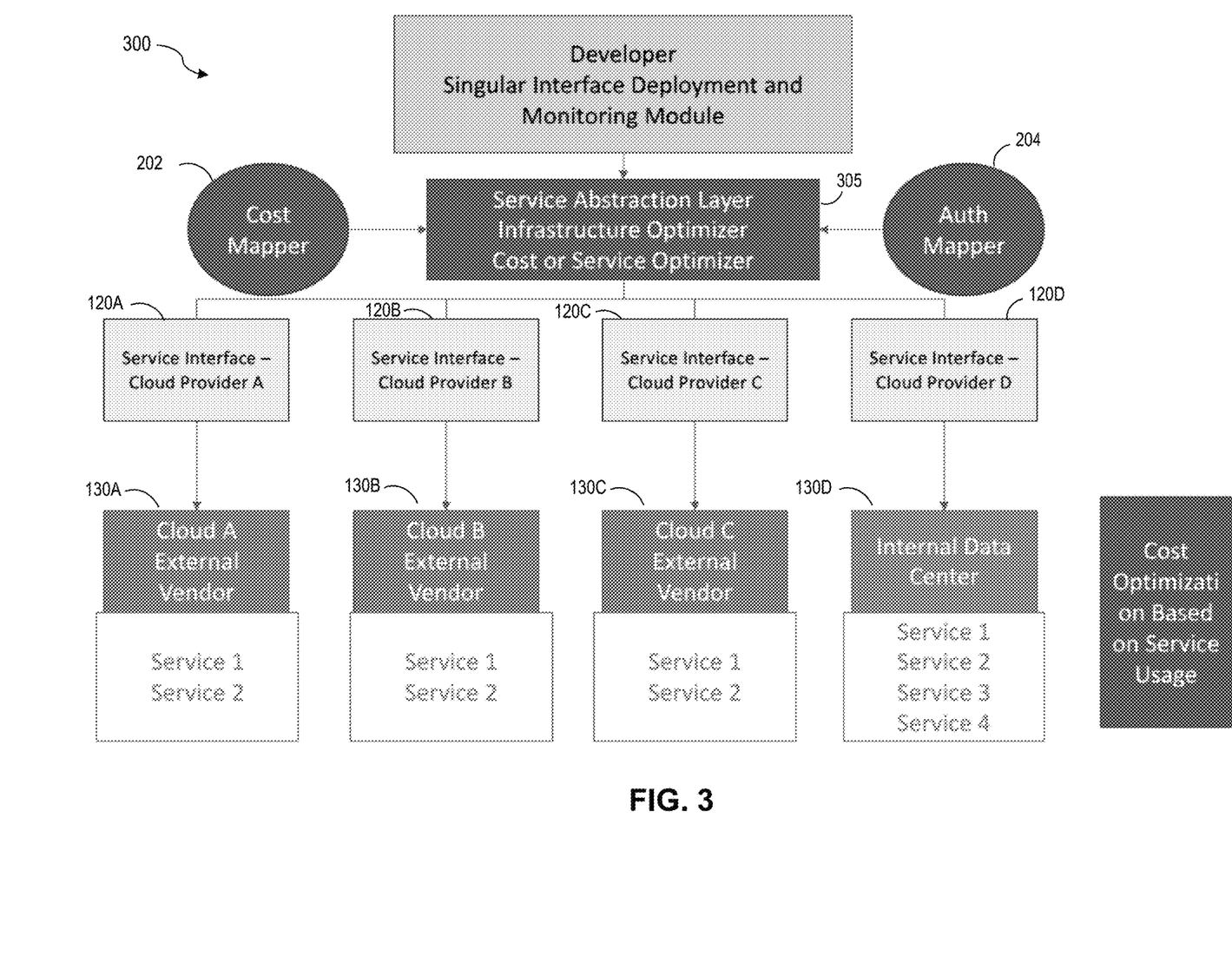
FIG. 3 depicts a diagram of a cloud services system including an abstraction layer, in accordance with some example embodiments.

FIG. 3 depicts a diagram illustrating a cloud services system 300, in accordance with some example implementations. The cloud services system 300 is similar to and adapted from the cloud services system 200 of FIG. 2. As such, at least some similarities between the cloud service system 200 and the cloud service system 200 are not repeated for sake of brevity. As shown in FIG. 3, the service abstraction layer 205 and the infrastructure optimizer 206 of the cloud services system 200 of FIG. 2 have been combined with a cost and/or service optimizer to form an abstraction layer 305. The abstraction layer 305 may perform the same functionalities as the service abstraction layer 205 and the infrastructure optimizer 206 but may also include further cost and/or service optimizations, such as a customer account provenance service and/or a service level agreement (SLA) optimization, as described below.

For example, in some implementations the abstraction layer 305 can monitor and evaluate the cloud provider and, based on such monitoring, enable dynamic matching of application capacity to the variances in the workload thereby optimizing predetermined key performance indicators (KPIs). For KPI optimization, a load to the application server, response time of business transactions, and/or concurrent active user sessions can be utilized and monitored. This can be performed in a "canary" landscape before the purchase or finalization of costs to a user. As such, a brokering functionality (e.g., part of the abstraction layer 305) in the architecture can establish an investment requirement on both the IaaS layer and higher layers to determine the investment requirement in terms of SLA optimization. This can prevent bulk cloud service investments to start a cloud project in a new cloud platform, thus at least reducing costs to a user.

Figure 4:
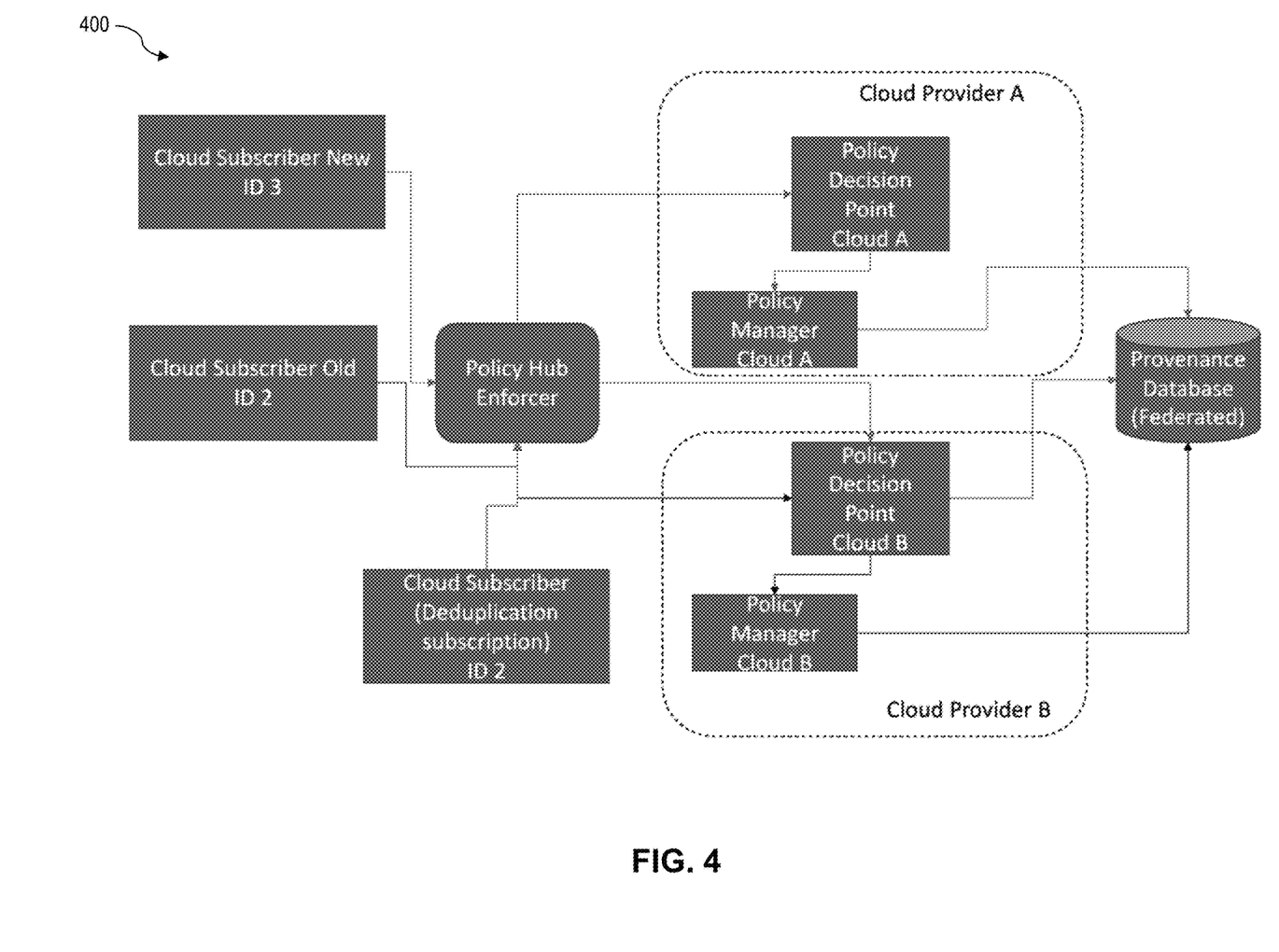
FIG. 4 depicts a diagram of a customer account provenance service, in accordance with some example embodiments.

FIG. 4 depicts a customer account provenance service 400, in accordance with some example implementations. As shown in FIG. 4, a policy hub enforcer may receive request from different cloud subscribers and determine whether the subscriber is authorized to have a subscription with the cloud provider A and/or cloud provider B. The policy enforcer hub may communicate requests from subscribers to policy decision points A and B to determine whether the subscriber is authorized to access the cloud provider. The policy decision points may retrieve information from a policy manager associated with the cloud provider A and/or B which may segregate provenance data from the request and send the provenance data to a provenance database for storage. In some aspects, the policy hub enforcer and or one or more of the policy decision points may also segregate provenance information from its data making provenance information visible to everyone who has access to the data. This approach may overcome processing issues when the information grows arbitrarily large.

A scalable architecture for cloud provenance can overcome processing issues, such as when information for processing grows arbitrarily large. For example, the system 300 can use policy decision point components, as shown in FIG. 4, to determine access query, such as related to validity of a record by a user.

In some implementations, users of the system 300 can have a unique identifier assigned to part of the abstraction layer 305 that can help manage access to various layers. For example, a provenance score can be assigned for determining if there is a mismatch in organization level usage of an application and service resources. The following equations may be used for determining a usage score, a rental score, and a product score:

Usage score: $Ux^i = Cx^i + Mx^i + Wx^i$

Rental Score: $Rx^i = (Cx^i + Mx^i) * DRR + Wx^i$

Product Score = $Ux^i / Rx^i$

In the above example equations, the DRR can include the daily rental rates for the cloud platform operator. In addition, the C in the above example equations can include a contract based usage score based on time of usage, the M can include a mean score of components usage based on time of usage, and the W can include the weighted average of load per unit of time.

Figure 5:
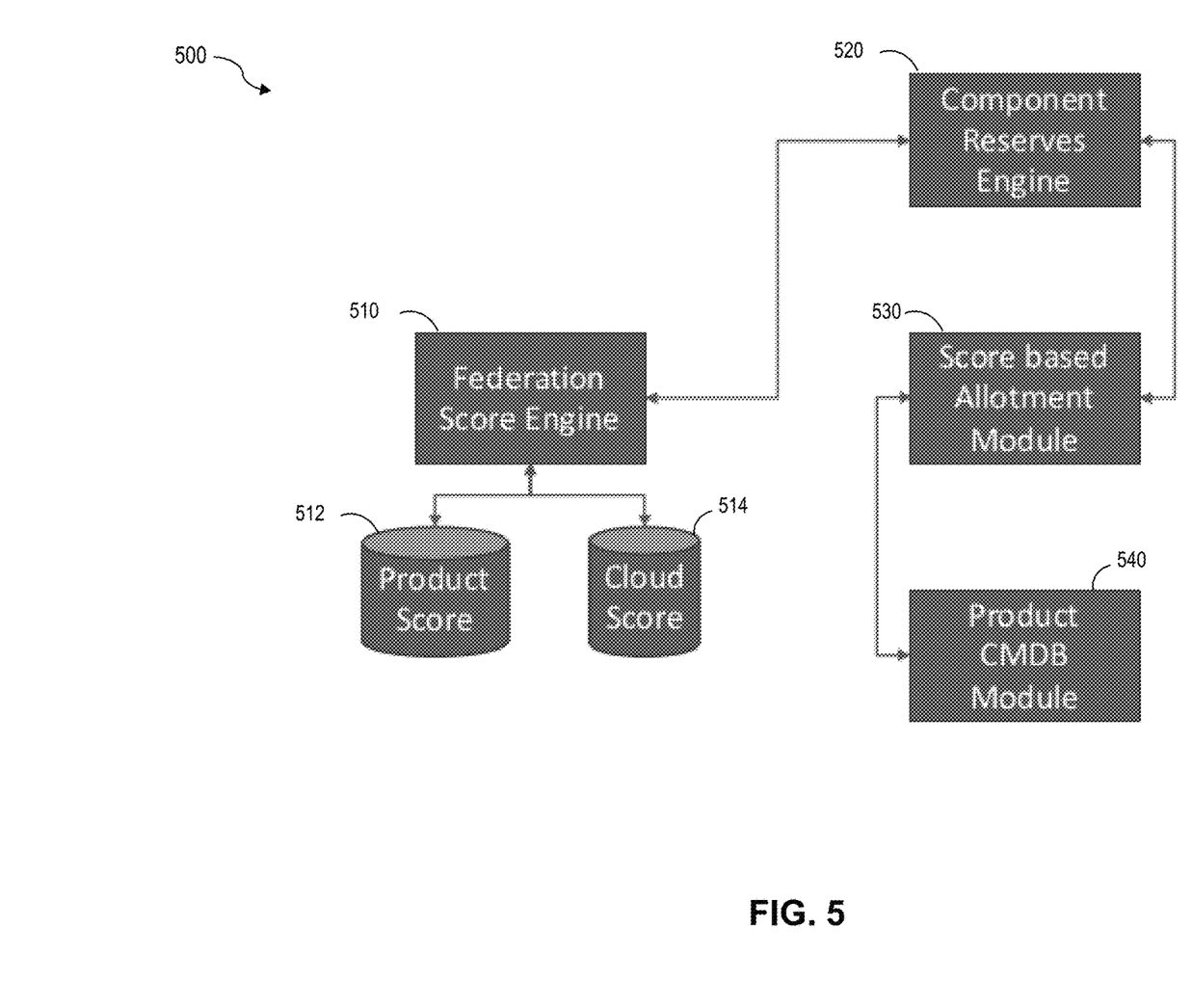
FIG. 5 depicts a diagram illustrating a service level agreement optimization, in accordance with some example embodiments.

FIG. 5 is a block diagram depicting a system 500 for service level agreement (SLA) optimization, in accordance with some example implementations. In some aspects, cloud components used as resources for a software application may be optimized based on a variety of parameters such as usage, processing capability, product scores, stability, and/or the like. As shown in FIG. 5, the system 500 includes a score engine 510 that receives information from a product score database 512 and a cloud score database 514. The system 500 further includes a component reserves engine 520, an allotment module 530, and a product configuration management database (CMDB) module 540. The component reserves engine 520 may reserve resources for the user based on the user's SLA with one or more cloud vendors 130. The component reserves engine 520 may receive a score from the allotment module 530 indicating which components or resource are available during certain times. The score may be based on information retrieved from the product CMDB module 540 which stores information regarding resource usage for the user and/or other users. In some aspects, the abstraction layer 305 monitor information from one or more of the components of the diagram 500 and provide a recommendation to the user to change the current SLA for a particular service based on the usage information and other information received from the respective components of diagram 500.

Figure 6:
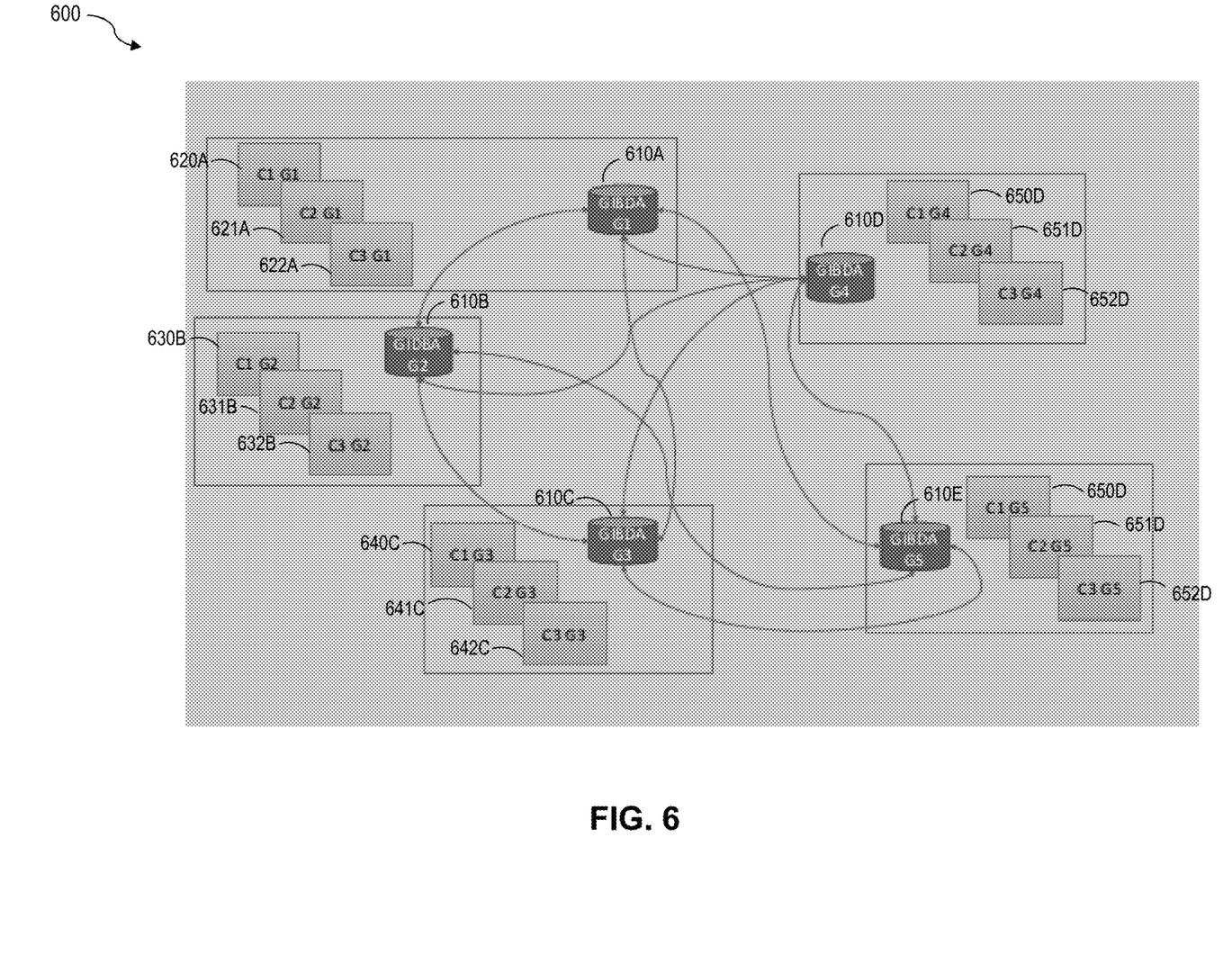
FIG. 6 depicts a diagram of a global cloud repository service, in accordance with some example embodiments.

FIG. 6 depicts a global cloud repository service 600, in accordance with some example implementations. In some aspects, one or more policy repositories across different geographical locations may be governed by a global data access system. As shown in FIG. 6, geography induced based data access (GIBDA) modules 610A-610E may include certain restrictions based on the geography of the user and/or cloud services. The different GIBDA modules 610A-E may be connected to a global data access policy which determines what information may be accessed in different geographic locations. The GIBDA modules 610A-E may utilize a combination of blockchain and data storage from which different geographic locations are governed to avoid discrepancy between users and also cloud service providers (e.g., cloud vendors 130). As shown in FIG. 6, each of the GIBDA modules 610A-E may be associated with cloud service providers and the respective GIBDA modules 610A-E may dictate which policies apply to the cloud service providers within a given geographic location.

Figure 7:
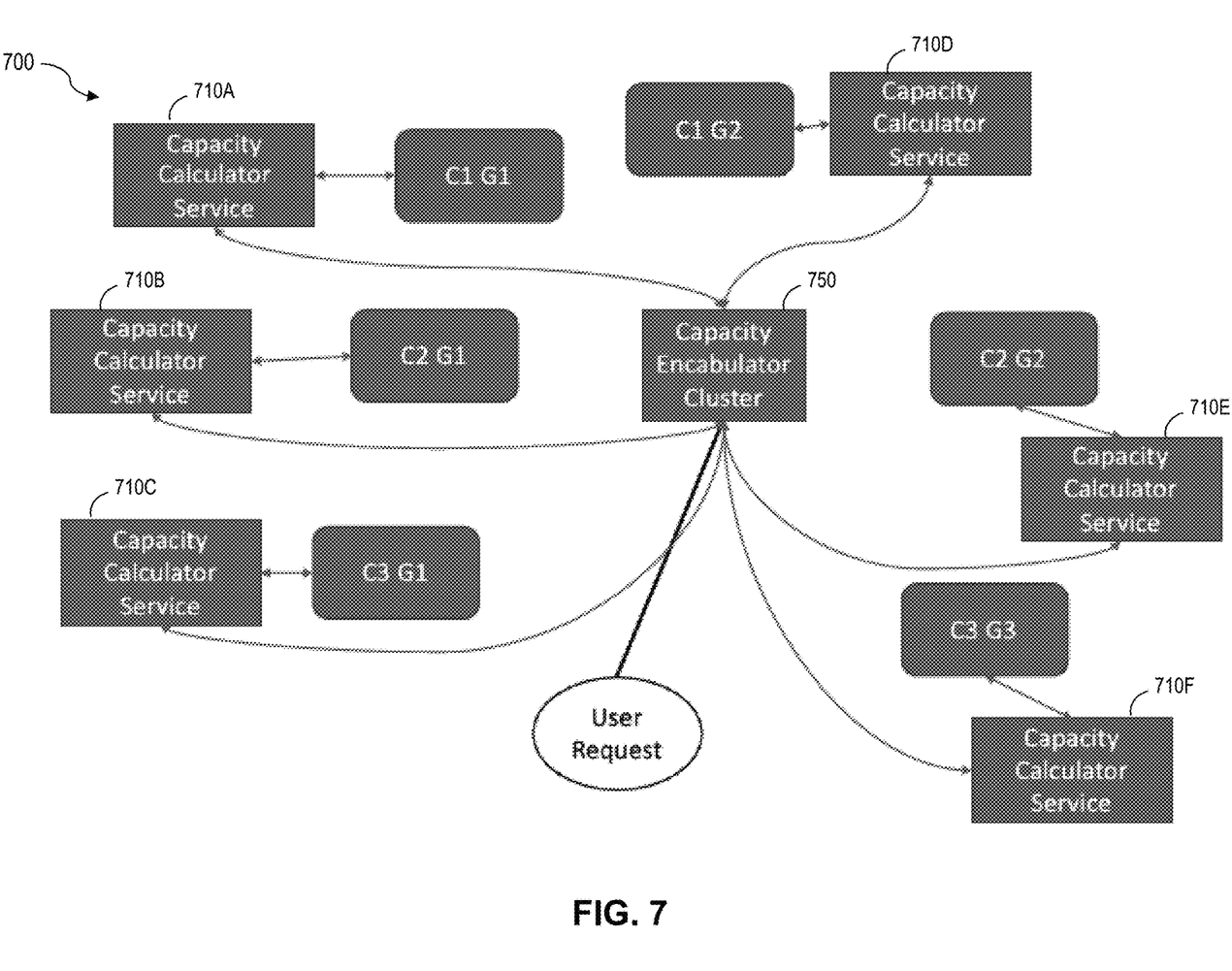
FIG. 7 depicts a diagram of a capacity discovery service, in accordance with some example embodiments.

FIG. 7 depicts a capacity discovery service 700, in accordance with some example implementations. In some aspects, users for new capacity requests in cloud environment can be shielded from vendor locking using an capacity encabulator cluster 750 which will direct the request based on cost, capacity, usage, location, requirement, and/or the like to a hybrid setup or to a best suitable cloud platform. As shown in FIG. 7, capacity encabulator cluster 750 communicates with different capacity calculator service processors 710 which are associated with different geographies and/or different cloud service providers.

Figure 8:
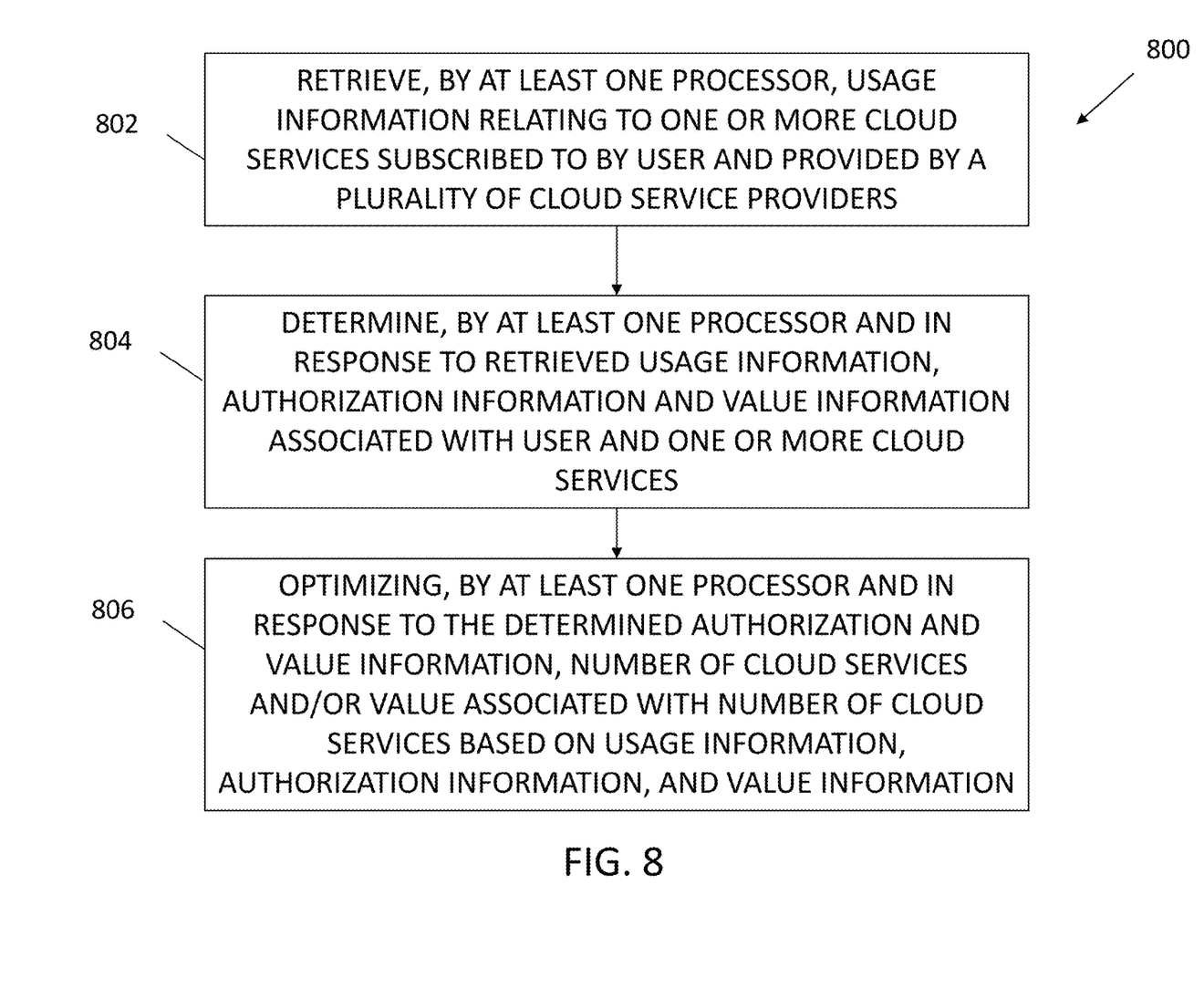
FIG. 8 depicts a flowchart illustrating a process for generating a process flow, in accordance with some example embodiments.

FIG. 8 depicts a flowchart of a process 800 for generating a process flow, in accordance with some example embodiments. For example, at least a part of the process 800 may be performed by the service abstraction layer 205, infrastructure optimizer 206, and/or combined service abstraction layer and infrastructure optimizer 306, as illustrated in FIGS. 2 and 3.

At 802, usage information relating to one or more cloud services subscribed to by a user and provided by a plurality of cloud service providers can be retrieved, such as by the combined service abstraction layer and infrastructure optimizer 306. At 804, authorization information and value information associated with the user and the one or more cloud services can be determined, such as by the combined service abstraction layer and infrastructure optimizer 306 and in response to the retrieved usage information. In some embodiments, the value information includes a price associated with a subscription for a single cloud service of the one or more cloud services. In some embodiments, the value information includes a price associated with a subscription for a bundle of cloud service of the one or more cloud services. Furthermore, in some embodiments the authorization information includes subscription information related to the one or more cloud services subscribed to by the user.

At 806, a number of cloud services and/or a value associated with the number of cloud services can be optimized based on the usage information, authorization information, and value information. In some embodiments, the combined service abstraction layer and infrastructure optimizer 306 can optimize the number of cloud services and/or the value associated with the number of cloud services. In addition, the number of cloud services and/or the value associated with the number of cloud services can be optimized in response to the determined authorization information and value information.

Figure 9:
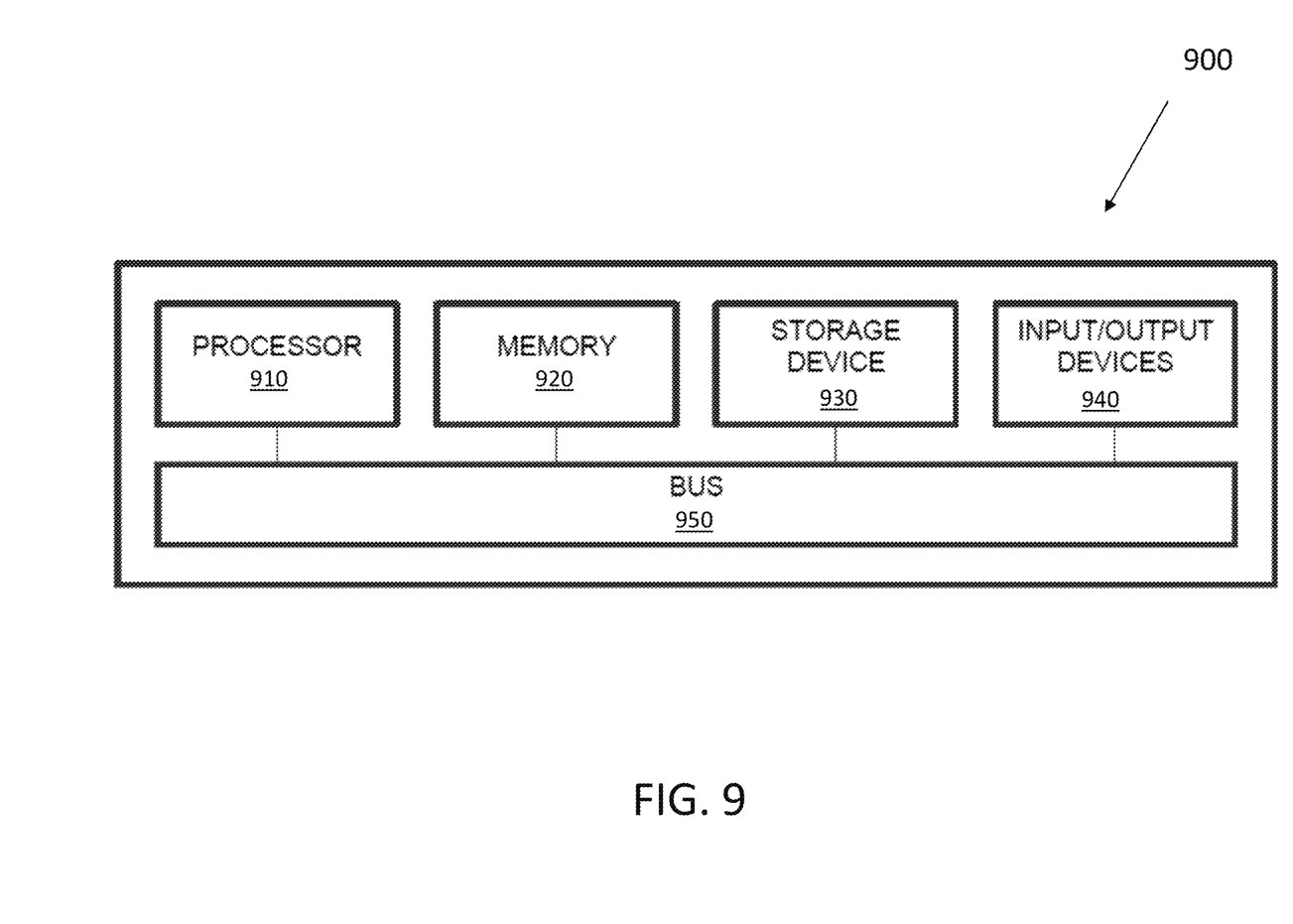
FIG. 9 depicts a block diagram illustrating a computing system, in accordance with some example embodiments.

FIG. 9 depicts a block diagram illustrating a computing system 900 consistent with implementations of the current subject matter. For example, referring to FIGS. 2 and 3, the computing system 900 can be used to implement the service abstraction layer 205, infrastructure optimizer 206, combined service abstraction layer and infrastructure optimizer 306 and/or any components therein.

As shown in FIG. 9, the computing system 900 can include a processor 910, a memory 920, a storage device 930, and input/output devices 940. The processor 910, the memory 920, the storage device 930, and the input/output devices 940 can be interconnected via a system bus 950. The processor 910 is capable of processing instructions for execution within the computing system 900. Such executed instructions can implement one or more components of, for example, the infrastructure optimizer 206. In some example embodiments, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some example embodiments, the input/output device 940 includes a keyboard and/or pointing device. In various implementations, the input/output device 940 includes a display unit for displaying graphical user interfaces.

According to some example embodiments, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some example embodiments, the computing system 900 can be used to execute various interactive computer software applications that can be used for organization, analysis and/or storage of data in various formats. Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
   retrieving, by a service abstraction layer of a cloud service deployment monitor, usage information relating to one or more cloud services subscribed to by a user, wherein the usage information is provided by a plurality of different cloud service providers, wherein the service abstraction layer provides a single interface configured to access corresponding cloud service interfaces at the plurality of different cloud service providers, to view the one or more cloud services at the plurality of different cloud service providers, and to use the one or more cloud services at the plurality of different cloud service providers, wherein the service abstraction layer includes an infrastructure optimizer, wherein the service abstraction layer is further coupled to a cost mapper and an authorization mapper, wherein the cost mapper maps values associated with the one or more cloud services at the plurality of different cloud service providers, wherein the authorization mapper determines which of the plurality of different cloud service providers are subscribed to by the user;
   in response to the retrieving, determining, by the service abstraction layer of the cloud service deployment monitor, authorization information including subscription information associated with the one or more cloud services subscribed to by the user and further determining value information including cost for one or more subscriptions for the one or more cloud services;
   in response to the determining, optimizing, by the service abstraction layer including, the infrastructure optimizer, a quantity of the one or more cloud services by comparing the one or more cloud services at the plurality of different cloud service providers, wherein the optimizing is based on the usage information, the authorization information, and the value information;
   removing, by the service abstraction layer including the infrastructure optimizer, at least one of the one or more cloud services;
   receiving, by the service abstraction layer of the cloud service deployment monitor, a request from at least one of the plurality of different cloud service providers; and
   in response to the received request, determining, by the service abstraction layer of the cloud service deployment monitor, the user is authorized to have a subscription with the at least one cloud service provider to allow access to the at least one of the plurality of different cloud service providers.

2. The method of claim 1, wherein the optimizing further comprises the abstraction layer including the infrastructure optimizer monitoring and evaluating the plurality of different cloud service providers to dynamically match capacity to variances in workload to optimize the quantity of the one or more cloud services.

3. The method of claim 2, wherein the optimizing further comprises the abstraction layer including the infrastructure optimizer monitoring and evaluating, at the plurality of different cloud service providers, application server load, response time of transactions, and concurrent active user sessions to optimize the quantity of the one or more cloud services.

4. The method of claim 1, wherein the optimizing includes unsubscribing the user from at least one cloud service of the one or more cloud services subscribed to by the user.

5. A system, comprising:
   at least one data processor; and
   at least one memory storing instructions which, when executed by the at least one data processor, result in operations comprising:
   retrieving, by a service abstraction layer of a cloud service deployment monitor, usage information relating to one or more cloud services subscribed to by a user, wherein the usage information is provided by a plurality of different cloud service providers, wherein the service abstraction layer provides a single interface configured to access corresponding cloud service interfaces at the plurality of different cloud service providers, to view the one or more cloud services at the plurality of different cloud service providers, and to use the one or more cloud services at the plurality of different cloud service providers, wherein the service abstraction layer includes an infrastructure optimizer, wherein the service abstraction layer is further coupled to a cost mapper and an authorization mapper, wherein the cost mapper maps values associated with the one or more cloud services at the plurality of different cloud service providers, wherein the authorization mapper determines which of the plurality of different cloud service providers are subscribed to by the user;
   in response to the retrieving, determining, by the service abstraction layer of the cloud service deployment monitor, authorization information including subscription information associated with the one or more cloud services subscribed to by the user and further determining value information including cost for one or more subscriptions for the one or more cloud services;

in response to the determining, optimizing, by the service abstraction layer including the infrastructure optimizer, a quantity of the one or more cloud services by comparing the one or more cloud services at the plurality of different cloud service providers, wherein the optimizing is based on the usage information, the authorization information, and the value information;

removing, by the service abstraction layer including the infrastructure optimizer, at least one of the one or more cloud services;

receiving, by the service abstraction layer of the cloud service deployment monitor, a request from at least one of the plurality of different cloud service providers; and in response to the received request, determining, by the service abstraction layer of the cloud service deployment monitor, the user is authorized to have a subscription with the at least one cloud service provider to allow access to the at least one of the plurality of different cloud service providers.

6. The system of claim 5, wherein the optimizing further comprises the abstraction layer including the infrastructure optimizer monitoring and evaluating the plurality of different cloud service providers to dynamically match capacity to variances in workload to optimize the quantity of the one or more cloud services.

7. The system of claim 5, wherein the optimizing further comprises the abstraction layer including the infrastructure optimizer monitoring and evaluating, at the plurality of different cloud service providers, application server load, response time of transactions, and concurrent active user sessions to optimize the quantity of the one or more cloud services.

8. The system of claim 5, wherein the optimizing includes unsubscribing the user from at least one cloud service of the one or more cloud services subscribed to by the user.

9. A non-transitory computer-readable medium storing instructions, which when executed by at least one data processor, result in operations comprising:

retrieving, by a service abstraction layer of a cloud service deployment monitor, usage information relating to one or more cloud services subscribed to by a user, wherein the usage information is provided by a plurality of different cloud service providers, wherein the service abstraction layer provides a single interface configured to access corresponding cloud service interfaces at the plurality of different cloud service providers, to view the one or more cloud services at the plurality of different cloud service providers, and to use the one or more cloud services at the plurality of different cloud service providers, wherein the service abstraction layer includes an infrastructure optimizer, wherein the service abstraction layer is further coupled to a cost mapper and an authorization mapper, wherein the cost mapper maps values associated with the one or more cloud services at the plurality of different cloud service providers, wherein the authorization mapper determines which of the plurality of different cloud service providers are subscribed to by the user;

in response to the retrieving, determining, by the service abstraction layer of the cloud service deployment monitor, authorization information including subscription information associated with the one or more cloud services subscribed to by the user and further determining value information including cost for one or more subscriptions for the one or more cloud services;

in response to the determining, optimizing, by the service abstraction layer including the infrastructure optimizer, a quantity of the one or more cloud services by comparing the one or more cloud services at the plurality of different cloud service providers, wherein the optimizing is based on the usage information, the authorization information, and the value information;

removing, by the service abstraction layer including the infrastructure optimizer, at least one of the one or more cloud services;

receiving, by the service abstraction layer of the cloud service deployment monitor, a request from at least one of the plurality of different cloud service providers; and in response to the received request, determining, by the service abstraction layer of the cloud service deployment monitor, the user is authorized to have a subscription with the at least one cloud service provider to allow access to the at least one of the plurality of different cloud service providers.

10. The non-transitory computer-readable medium of claim 9, wherein the optimizing further comprises the abstraction layer including the infrastructure optimizer monitoring and evaluating the plurality of different cloud service providers to dynamically match capacity to variances in workload to optimize the quantity of the one or more cloud services.

11. The non-transitory computer-readable medium of claim 9, wherein the optimizing further comprises the abstraction layer including the infrastructure optimizer monitoring and evaluating, at the plurality of different cloud service providers, application server load, response time of transactions, and concurrent active user sessions to optimize the quantity of the one or more cloud services.

12. The non-transitory computer-readable medium of claim 9, wherein the optimizing includes unsubscribing the user from at least one cloud service of the one or more cloud services subscribed to by the user.

* * * * *